US012334284B2

(12) United States Patent
Sato

(10) Patent No.: US 12,334,284 B2
(45) Date of Patent: Jun. 17, 2025

(54) SWITCH

(71) Applicant: Mitsubishi Electric Corporation, Tokyo (JP)

(72) Inventor: Motohiro Sato, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 139 days.

(21) Appl. No.: 18/245,915

(22) PCT Filed: Oct. 6, 2020

(86) PCT No.: PCT/JP2020/037880
§ 371 (c)(1),
(2) Date: Mar. 20, 2023

(87) PCT Pub. No.: WO2022/074736
PCT Pub. Date: Apr. 14, 2022

(65) Prior Publication Data
US 2023/0386770 A1 Nov. 30, 2023

(51) Int. Cl.
*H01H 33/42* (2006.01)
*H01H 33/666* (2006.01)

(52) U.S. Cl.
CPC .......... *H01H 33/42* (2013.01); *H01H 33/666* (2013.01)

(58) Field of Classification Search
CPC .. H01H 33/42; H01H 33/666; H01H 33/6662; H01H 33/662; H01H 33/664;
(Continued)

(56) References Cited

U.S. PATENT DOCUMENTS 9,082,563 B2 * 7/2015 Hasegawa ................ H01H 3/60
9,183,996 B2 * 11/2015 Karlström ............ H01H 33/285
(Continued)

FOREIGN PATENT DOCUMENTS

EP 3089188 A1 11/2016
FR 2970370 A1 7/2012
(Continued)

OTHER PUBLICATIONS

Extended European Search Report dated Nov. 24, 2023, issued in the corresponding European Patent Application No. 20956685.0, 8 pages.

(Continued)

*Primary Examiner* — William A Bolton
(74) *Attorney, Agent, or Firm* — BUCHANAN, INGERSOLL & ROONEY PC

(57) ABSTRACT

A switch includes: a plurality of electrode portions each including a fixed electrode and a movable electrode, the movable electrode being capable of moving with respect to the fixed electrode; an operating device including a first movable portion for collectively performing tripping operation for the plurality of electrode portions, the movable electrodes being separated from the fixed electrodes in the tripping operation; a second movable portion integrated with the respective movable electrodes of the plurality of electrode portions; a first elastic part that applies pressure for bringing the movable electrodes into contact with the fixed electrodes, the first elastic part being disposed between the first movable portion and the second movable portion; and a damping mechanism that damps contraction of the first elastic part during the tripping operation.

7 Claims, 3 Drawing Sheets

(58) Field of Classification Search
CPC ... H01H 2033/6648; H01H 2033/6665; H01H 3/60
USPC .................................. 218/139, 118, 138, 140
See application file for complete search history.

(56) References Cited

U.S. PATENT DOCUMENTS

| | | | | |
|---|---|---|---|---|
| 9,324,521 | B2 | 4/2016 | Nakayama et al. | |
| 9,508,514 | B2 * | 11/2016 | Ohda | H01H 50/32 |
| 10,090,126 | B2 * | 10/2018 | Kakio | H01H 50/305 |
| 2020/0075274 | A1 * | 3/2020 | Park | H01H 33/50 |
| 2022/0262584 | A1 | 8/2022 | Sato et al. | |

FOREIGN PATENT DOCUMENTS

| | | | |
|---|---|---|---|
| JP | 2001210195 | A | 8/2001 |
| JP | 2005079009 | A | 3/2005 |
| JP | 2006164654 | A | 6/2006 |
| WO | 2012086293 | A1 | 6/2012 |

OTHER PUBLICATIONS

International Search Report (PCT/ISA/210) with translation and Written Opinion (PCT/ISA/237) mailed on Dec. 8, 2020 by the Japan Patent Office as the International Searching Authority for International Application No. PCT/JP2020/037880. (8 pages).

* cited by examiner

SWITCH

FIELD

The present disclosure relates to a switch that opens and closes an electric circuit.

BACKGROUND

Some switches each including a fixed electrode and a movable electrode as a pair of electrodes, are provided with contact pressure springs for applying contact pressure to the fixed electrodes and the movable electrodes. When the switch is in a closed state in which the movable electrode is in contact with the fixed electrode, the movable electrode is pressed against the fixed electrode by the contact pressure spring in a contracted state. As a result, contact pressure is applied to the fixed electrode and the movable electrode. In tripping operation of separating the movable electrode from the fixed electrode, the movable electrode starts to be separated from the fixed electrode after the contracted contact pressure spring extends and the contact pressure becomes zero.

Patent Literature 1 discloses a so-called three-phase collective drive type switch that collectively performs tripping operation of three-phase electrodes by using a single operating device. A contact pressure spring is provided for each of the three phases in the switch of Patent Literature 1.

CITATION LIST

Patent Literature

Patent Literature 1: Japanese Patent Application Laid-open No. 2005-79009

SUMMARY

Technical Problem

Concerning a switch including a contact pressure spring, when an opening action is performed in which a movable electrode is separated from a fixed electrode, the contact pressure spring in a contracted state once extends, and then contracts again by receiving the kinetic energy of the movable electrode, so that the movable electrode may continue to move after an operating device finishes the action in some cases. When a damping mechanism that damps contraction of the contact pressure spring is provided in the switch, the switch can reduce vibration of the movable electrode after the operating device finishes the action. The switch can obtain high breaking performance by reducing the vibration of the movable electrode in the opening action.

In the case of the switch disclosed in Patent Literature 1, because the contact pressure spring is provided for each of the three phases, a damping mechanism is provided for each of the three phases. Because the damping mechanism is provided for each of the three phases, the configuration of the switch becomes complicated. Therefore, the switch disclosed in Patent Literature 1 has a problem in that while breaking performance can be improved, the configuration of the switch becomes complicated.

The present disclosure has been made in view of the above, and an object of the present disclosure is to obtain a switch capable of obtaining high breaking performance in a plurality of electrodes with a simple configuration.

Solution to Problem

To solve the above problem and achieve an object, a switch according to the present disclosure includes: a plurality of electrode portions each including a fixed electrode and a movable electrode, the movable electrode being capable of moving with respect to the fixed electrode; an operating device including a first movable portion for collectively performing tripping operation for the plurality of electrode portions, the movable electrodes being separated from the fixed electrodes in the tripping operation; a second movable portion integrated with the respective movable electrodes of the plurality of electrode portions; a first elastic part to apply pressure for bringing the movable electrodes into contact with the fixed electrodes, the first elastic part being disposed between the first movable portion and the second movable portion; and a damping mechanism to damp contraction of the first elastic part during the tripping operation.

Advantageous Effects of Invention

The switch according to the present disclosure has an effect of allowing high breaking performance in the plurality of electrodes to be obtained with a simple configuration.

DESCRIPTION OF EMBODIMENTS

Hereinafter, a switch according to an embodiment will be described in detail with reference to the drawings.

First Embodiment

Figure 1:
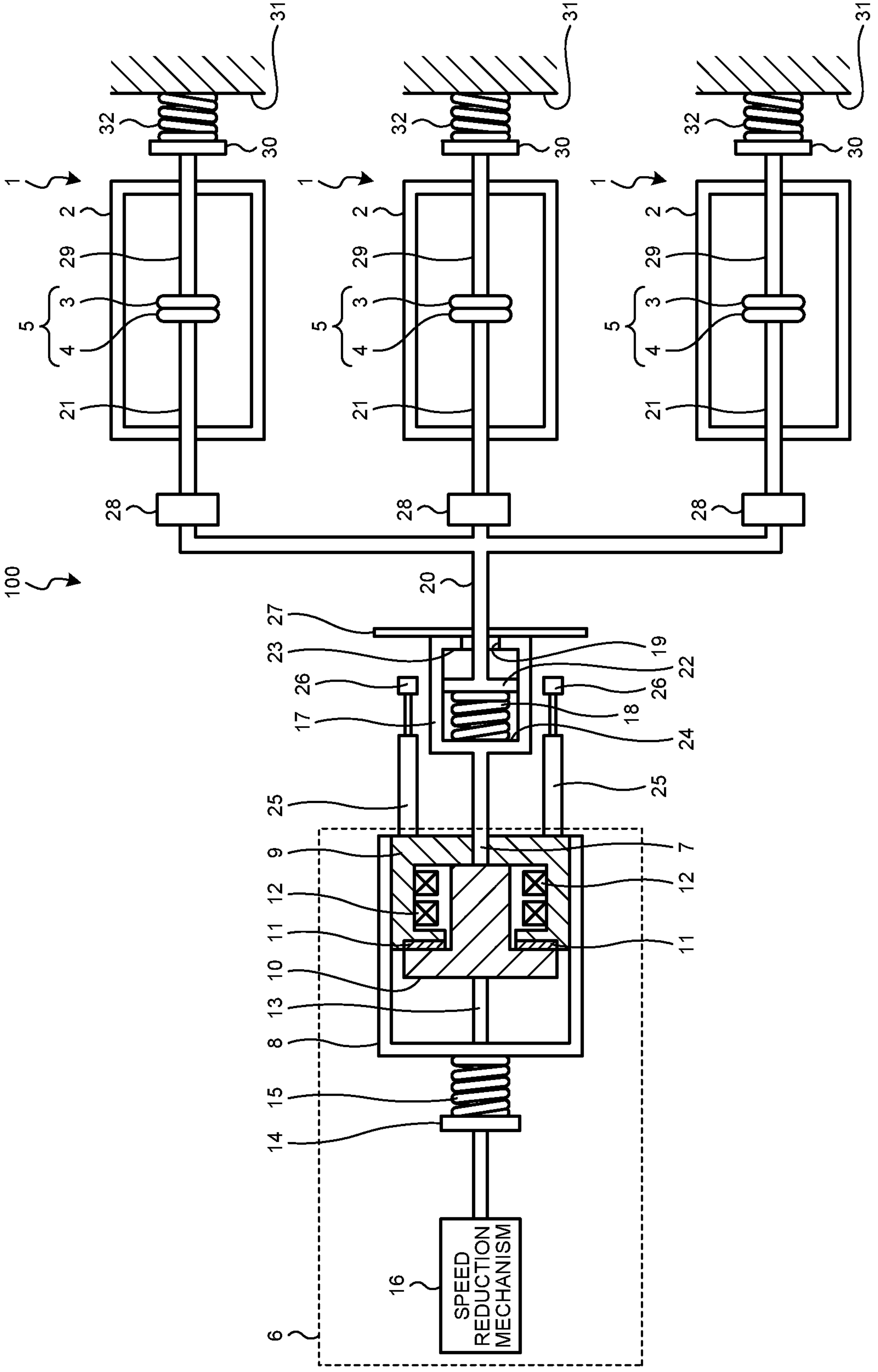
FIG. 1 is a first diagram illustrating a schematic configuration of a vacuum circuit breaker as a switch according to a first embodiment.
Figure 2:
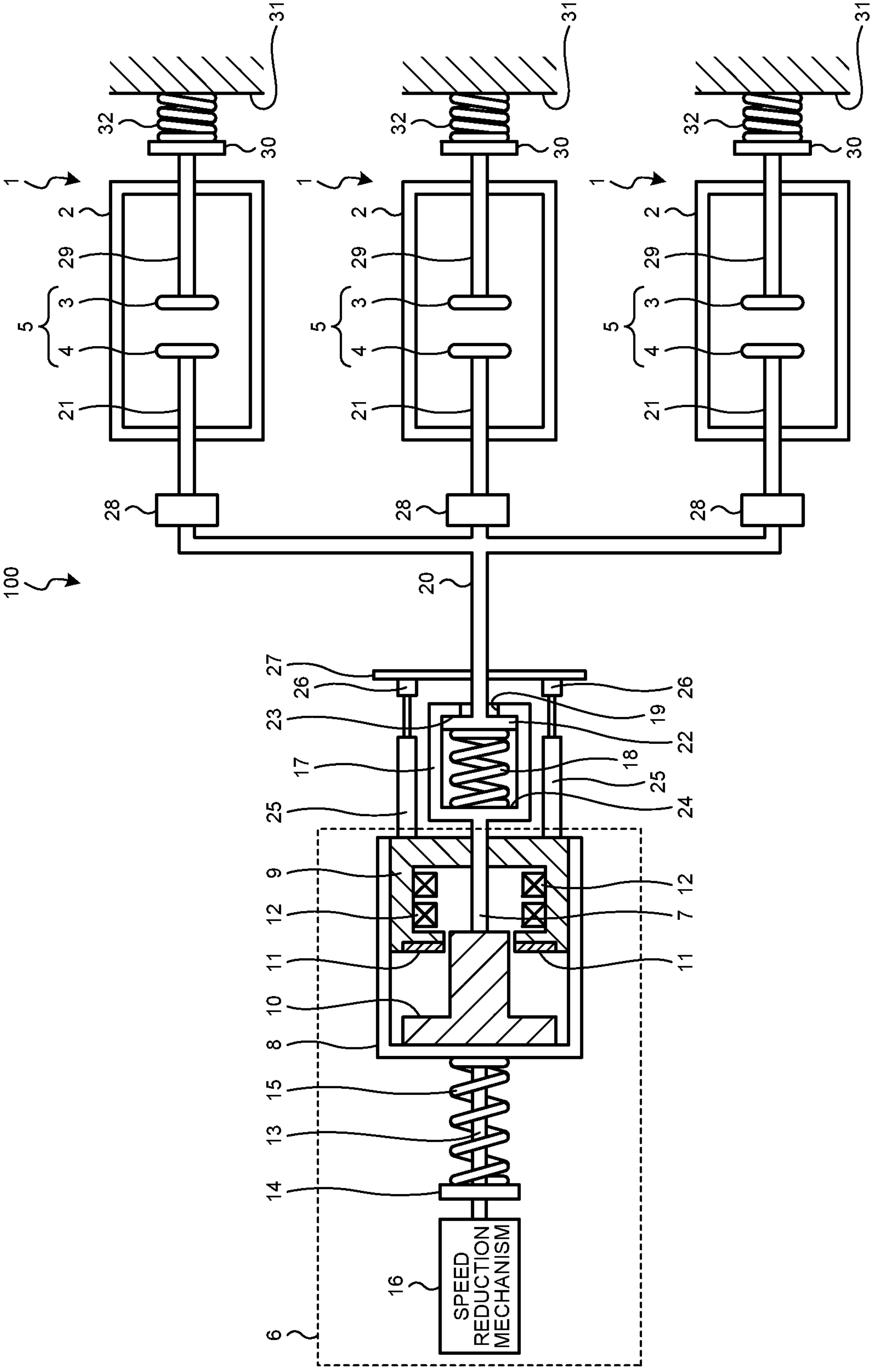
FIG. 2 is a second diagram illustrating the schematic configuration of the vacuum circuit breaker as the switch according to the first embodiment.

FIG. 1 is a first diagram illustrating a schematic configuration of a vacuum circuit breaker 100 that is a switch according to a first embodiment. FIG. 2 is a second diagram illustrating the schematic configuration of the vacuum circuit breaker 100 that is the switch according to the first embodiment. The vacuum circuit breaker 100 is a three-phase collective drive type vacuum circuit breaker.

The vacuum circuit breaker 100 includes three vacuum valves 1. Each vacuum valve 1 includes a vacuum vessel 2, a fixed electrode 3, and a movable electrode 4. The vacuum vessel 2 is a cylindrical hollow body. The fixed electrode 3 is fixed inside the vacuum vessel 2. The movable electrode 4 can move with respect to the fixed electrode 3 in the vacuum vessel 2. The fixed electrode 3 and the movable electrode 4 of each vacuum valve 1 constitute an electrode portion 5 that is a pair of electrodes disposed inside the vacuum vessel 2 in which a high vacuum is produced. The vacuum circuit breaker 100 includes three electrode portions 5. The vacuum circuit breaker 100 opens and closes an electric circuit by moving the movable electrode 4 in each vacuum valve 1.

In the following description, a state in which the fixed electrode 3 and the movable electrode 4 are electrically connected in each vacuum valve 1 is referred to as a closed state, and a state in which the fixed electrode 3 and the movable electrode 4 are electrically disconnected in each vacuum valve 1 is referred to as an open state. FIG. 1 illustrates the vacuum circuit breaker 100 in the closed state. FIG. 2 illustrates the vacuum circuit breaker 100 in the open state. The vacuum circuit breaker 100 closes the electric circuit by connecting the fixed electrode 3 and the movable electrode 4, and opens the electric circuit by disconnecting the fixed electrode 3 and the movable electrode 4 from each other. Note that FIGS. 1 and 2 illustrate some constituent elements of the vacuum circuit breaker 100 in cross section and other constituent elements of the vacuum circuit breaker 100 in plan view.

The vacuum circuit breaker 100 includes an operating device 6 that operates the electrode portion 5 of each vacuum valve 1. The operating device 6 includes a movable shaft 7. The movable shaft 7 constitutes a first movable portion for collectively performing tripping operation and closing operation for the three electrode portions 5. The tripping operation is operation of separating, from the fixed electrode 3, the movable electrode 4 in contact with the fixed electrode 3. The closing operation is operation of drawing the movable electrode 4 being away from the fixed electrode 3 toward the fixed electrode 3, and bringing the movable electrode 4 into contact with the fixed electrode 3. Note that in the following description, a direction in which the movable shaft 7 moves in the tripping operation is referred to as an opening direction, and a direction in which the movable shaft 7 moves in the closing operation is referred to as a closing direction.

The operating device 6 includes a case 8, a fixed iron core 9, and a movable iron core 10. The case 8 has a cylindrical shape. The fixed iron core 9 is fitted into the case 8. The movable iron core 10 is disposed in the case 8. The fixed iron core 9 and the movable iron core 10 are disposed coaxially with each other. The movable iron core 10 moves in an axial direction in the case 8. A permanent magnet 11 is provided on a part of the fixed iron core 9 with which the movable iron core 10 comes into contact in the closed state.

The operating device 6 includes a plurality of drive coils 12 that drives the movable iron core 10. The plurality of drive coils 12 includes a drive coil 12 for the tripping operation and a drive coil 12 for the closing operation. Each drive coil 12 is surrounded by the fixed iron core 9, and is wound with respect to the axis of the fixed iron core 9. Each drive coil 12 generates magnetic flux passing through the fixed iron core 9 and the movable iron core 10. A drive circuit is provided in the operating device 6. The drive circuit causes a current to flow through each of the plurality of drive coils 12. The drive circuit is not illustrated in FIGS. 1 and 2.

A movable shaft 13 is connected to an end of the movable iron core 10 in the opening-direction. The movable shaft 13 penetrates a wall of the case 8 in the opening-direction, and extends from the inside of the case 8 to the outside of the case 8. A spring bearing 14 is provided on a part of the movable shaft 13 protruding from the case 8. A coil spring 15, which is an elastic part, is provided between the case 8 and the spring bearing 14. An end of the coil spring 15 in the opening-direction is in contact with the spring bearing 14. An end of the coil spring 15 in the closing-direction is in contact with the case 8. The movable shaft 13 is passed through the center of the coil spring 15.

An end of the movable shaft 13 in the opening-direction is connected to a speed reduction mechanism 16. The speed reduction mechanism 16 reduces the speed of the movable iron core 10 during the tripping operation. A dash pot can be used for the speed reduction mechanism 16.

The movable shaft 7 is connected to an end of the movable iron core 10 in the closing-direction. The movable shaft 7 penetrates the fixed iron core 9, and extends from the inside of the case 8 to the outside of the case 8. An end of the movable shaft 7 in the opening-direction is connected to the movable iron core 10. The movable shaft 7 is provided with a hollow housing portion 17 at an end in the closing-direction. A coil spring 18, which is a first elastic part, is housed in the housing portion 17. The coil spring 18 is a contact pressure spring that applies pressure for bringing the movable electrode 4 into contact with the fixed electrode 3 in each vacuum valve 1.

The movable shaft 7 and the housing portion 17 are constituent elements that move integrally with the movable iron core 10, and serve as part of the operating device 6. The movable shaft 7 and the housing portion 17 correspond to a first movable portion for collectively performing the tripping operation and the closing operation for the three electrode portions 5. Note that the configuration of the operating device 6 described in the first embodiment is an example. The configuration of the operating device 6 may be appropriately changed.

An opening 19 is formed in an end of the housing portion 17 in the closing-direction. An operating rod 20 is passed through the opening 19, and extends from the inside of the housing portion 17 to the outside of the housing portion 17. The operating rod 20 is divided into three movable shafts 21 outside the housing portion 17. An end of each of the movable shafts 21 in the closing-direction is inserted in the vacuum vessel 2. The movable electrode 4 is fixed to the closing-direction end of each of the movable shafts 21. The operating rod 20 and the three movable shafts 21 correspond to a second movable portion integrated with the respective movable electrodes 4 of the three electrode portions 5.

A flange portion 22 is provided at an end of the operating rod 20 in the opening-direction. The flange portion 22 is disposed inside the housing portion 17. The outer shape of the flange portion 22 is larger than the opening 19. In the closed state, the flange portion 22 is located away, in the opening direction, from an inner wall surface 23 of the housing portion 17 in the closing-direction. In the open state, the flange portion 22 is in contact with the inner wall surface 23.

An end of the coil spring 18 in the opening-direction is in contact with an inner wall surface 24 of the housing portion 17 in the opening-direction. An end of the coil spring 18 in the closing-direction is in contact with the flange portion 22. That is, the coil spring 18 is disposed between the first movable portion and the second movable portion. Note that the first elastic member to be disposed between the first movable portion and the second movable portion may be an elastic part other than the coil spring 18. The first elastic part may be a spring other than the coil spring 18, such as a disc spring or a leaf spring. The first elastic part may be an elastic part other than a spring.

The operating device 6 is provided with shock absorbers 25. The shock absorbers 25 correspond to a damping mechanism that damps contraction of the first elastic part during the tripping operation. The shock absorbers 25 damp contraction of the first elastic part caused by continuous movement of the second movable portion during deceleration of the first movable portion.

When a force in the opening direction is applied to an end 26 that is an end of the shock absorber 25 in the closing-direction, the shock absorber 25 displaces the end 26 in the opening direction. The shock absorbers 25 reduce speed at which the ends 26 move in the opening direction, by generating resistance forces against the force applied to the ends 26.

The operating rod 20 is provided with a flat plate 27 located between the housing portion 17 and the movable shafts 21. The operating rod 20 penetrates the flat plate 27. The flat plate 27 is fixed to the operating rod 20. The flat plate 27 moves in the axial direction together with the operating rod 20. In the closed state, the ends 26 are located away from the flat plate 27 in the opening direction. In the open state, the ends 26 are in contact with the flat plate 27.

Each of the three movable shafts 21 is provided with an adjustment part 28 that adjusts the length of the movable shaft 21. The adjustment part 28 is attached to a part of the corresponding movable shaft 21 protruding from the vacuum vessel 2. The three adjustment parts 28 form an adjustment mechanism capable of individually adjusting distances between the coil spring 18 and the respective movable electrodes 4 of the three electrode portions 5 in a direction in which the second movable portion moves. The direction in which the second movable portion moves refers to the direction of the central axis of each vacuum valve 1.

A turnbuckle can be used as the adjustment part 28. The turnbuckle is located between and connected to two bars forming the movable shaft 21. The turnbuckle includes a body frame and a first threaded rod and a second threaded rod with opposite threads. The first threaded rod is screwed into one end of the body frame. The second threaded rod is screwed into an opposite end of the body frame. The first threaded rod is coupled to one of the two bars and the second threaded rod is coupled to the other bar. As a result, the turnbuckle is located between and connected to the two bars. The length of the movable shaft 21 is adjusted by means of the body frame rotated in such a way as to move the first threaded rod and the second threaded rod close to each other or away from each other. Note that the turnbuckle is not illustrated. The adjustment part 28 may be a part other than the turnbuckle as long as the adjustment part 28 is a part capable of adjusting the length of the movable shaft 21.

In each vacuum valve 1, the fixed electrode 3 is fixed to an end of a fixed shaft 29 in the opening-direction. An end 30 that is an end of the fixed shaft 29 in the closing-direction is located outside the vacuum vessel 2. The end 30 faces a surface 31 of a support that supports the fixed electrode 3 and the fixed shaft 29.

A coil spring 32, which is a second elastic part, is disposed between the end 30 and the surface 31. The coil spring 32 is a contact pressure spring that applies pressure for bringing the fixed electrode 3 into contact with the movable electrode 4. An end of the coil spring 32 in the opening-direction is in contact with the end 30. An end of the coil spring 32 in the closing-direction is in contact with the surface 31.

Next, operation of the vacuum circuit breaker 100 will be described with reference to FIGS. 1 and 2. When the vacuum circuit breaker 100 is in the closed state as illustrated in FIG. 1, the permanent magnet 11 attracts the movable iron core 10. When the movable iron core 10 is attracted to the permanent magnet 11, the end of the movable iron core 10 in the closing-direction is in contact with the fixed iron core 9. The movable shaft 7 is located at a position corresponding to a limit of the range of axial movement of the movable shaft 7 in the closing-direction. In FIG. 1, the flat plate 27 is in contact with the housing portion 17. The coil spring 18 is contracted between the inner wall surface 24 and the flange portion 22. The reaction force of the coil spring 18 causes the operating rod 20 and each movable shaft 21 to press the movable electrode 4 against the fixed electrode 3.

Furthermore, the reaction force of the coil spring 32 causes the fixed shaft 29 to press the fixed electrode 3 against the movable electrode 4. A length by which the coil spring 18 contracts in the closed state is longer than a length by which each coil spring 32 contracts in the closed state. Because the coil spring 32 is provided between the surface 31 and the fixed electrode 3 for each of the three fixed electrodes 3, the vacuum circuit breaker 100 can equally apply the load of the coil spring 18 to each of the three fixed electrodes 3.

The coil spring 15 is contracted between the case 8 and the spring bearing 14. A reaction force of the coil spring 15 is applied to the spring bearing 14. Because an attraction force by which the permanent magnet 11 attracts the movable iron core 10 is larger than the reaction force of the coil spring 15, the vacuum circuit breaker 100 maintains the closed state.

When the vacuum circuit breaker 100 is in the closed state, the operating device 6 causes a current to flow to the drive coil 12 for the tripping operation in response to a command for the tripping operation, input to the operating device 6. The command is input to the operating device 6 from a control panel that controls the vacuum circuit breaker 100. The control panel is not illustrated.

The current flowing through the drive coil 12 for the tripping operation causes the drive coil 12 for the tripping operation to generate an electromagnetic force capable of canceling the magnetic force of the permanent magnet 11. The electromagnetic force generated by the drive coil 12 for the tripping operation and the magnetic force of the permanent magnet 11 cancel each other. As a result, the magnetic force of the permanent magnet 11 is weakened. When the reaction force of the coil spring 15 exceeds the attraction force by which the permanent magnet 11 attracts the movable iron core 10 due to the weakened magnetic force of the permanent magnet 11, the coil spring in a contracted state extends to move the spring bearing 14 in the opening direction. The movable shaft 13 and the movable iron core 10 move in the opening direction together with the spring bearing 14. In this manner, the vacuum circuit breaker 100 moves the movable iron core 10 in the opening direction.

The movable shaft 7 and the housing portion 17 move in the opening direction together with the movable iron core 10. As the housing portion 17 moves in the opening direction, the distance between the flange portion 22 and the inner wall surface 23 is gradually reduced, and the coil spring 18 extends. The extension of the coil spring 18 weakens the contact pressure between the fixed electrode 3 and the movable electrode 4 in each vacuum valve 1. The movable shaft 7 and the housing portion 17 further move in the opening direction after the flange portion 22 comes into contact with the inner wall surface 23. As a result, the operating rod 20 and each movable shaft 21 move in the opening direction together with the movable shaft 7 and the housing portion 17. The movement of the movable shaft 21 in the opening direction separates the movable electrode 4 from the fixed electrode 3 in each vacuum valve 1. When the movable electrode 4 is separated from the fixed electrode 3 and an arc generated between the fixed electrode 3 and the movable electrode 4 is extinguished, the vacuum circuit breaker 100 makes a transition from the closed state to the open state.

The flat plate 27 moves in the opening direction together with the operating rod 20 to reach the ends 26. When the flat plate 27 is brought into contact with the ends 26, a force in the opening direction is applied to the ends 26. The shock absorbers 25 each generate resistance forces against the force applied to the ends 26. The shock absorbers 25 relax movement of the operating rod 20 by generating resistance forces to absorb the kinetic energy of the operating rod 20.

When the vacuum circuit breaker 100 is in the open state as illustrated in FIG. 2, the operating device 6 causes a current to flow to the drive coils 12 for the closing operation in response to a command for the closing operation, input to the operating device 6. The command is input from the control panel to the operating device 6.

The current flowing through the drive coils 12 for the closing operation causes each of the drive coils 12 for the closing operation to generate an electromagnetic force that attracts the movable iron core 10. The electromagnetic force generated by the drive coil 12 for the closing operation and the magnetic force of the permanent magnet 11 cause the movable iron core 10 to move in the closing direction while contracting the coil spring The movable shaft 7 and the housing portion 17 move in the closing direction together with the movable iron core 10. The operating rod 20 and each movable shaft 21 move in the closing direction together with the housing portion 17. The movement of the movable shaft 21 in the closing direction causes the movable electrode 4 to reach the fixed electrode 3 in each vacuum valve 1. Furthermore, a contact pressure is applied to the fixed electrode 3 and the movable electrode 4 in each vacuum valve 1 as the coil spring 18 is contracted in the housing portion 17. In this manner, the vacuum circuit breaker 100 makes a transition from the open state to the closed state.

Assume that the speed reduction mechanism 16 starts to decelerate the movable iron core 10 after the movable electrode 4 is separated from the fixed electrode 3 in each vacuum valve 1 during the tripping operation. Because the movable shaft 7 and the housing portion 17 are integrated with the movable iron core 10, deceleration of the movable shaft 7 and the housing portion 17 is started together with deceleration of the movable iron core 10. When deceleration of the housing portion 17 is started, an inertial force due to movement of the operating rod 20 in the opening direction is applied to the coil spring 18. When the coil spring 18 is contracted by the inertial force while the housing portion 17 is decelerated, the operating rod 20 is not decelerated, and continues to move at the same speed as before the start of deceleration of the movable iron core 10.

In the first embodiment, the vacuum circuit breaker 100 uses the shock absorbers 25 to damp contraction of the coil spring 18 caused by continuous movement of the operating rod 20 during the deceleration of the movable shaft 7 and the housing portion 17. The vacuum circuit breaker 100 can decelerate the operating rod 20 in conjunction with the deceleration of the movable shaft 7 by damping the contraction of the coil spring 18. The vacuum circuit breaker 100 can accurately reflect speed adjustment performed by the operating device 6 in the speed of each movable electrode 4 by decelerating the operating rod 20 in conjunction with the deceleration of the movable shaft 7.

An axial magnetic field may be generated between the fixed electrode 3 and the movable electrode 4. When the axial magnetic field is generated, an arc generated between the fixed electrode 3 and the movable electrode 4 during the tripping operation spreads over entire electrode surfaces, so that the density of current due to arc discharge decreases. As the current density decreases, the fixed electrode 3 and the movable electrode 4 are prevented from melting. The vacuum circuit breaker 100 can easily interrupt current by reducing vapor to be generated by melting. Note that an electrode that generates an axial magnetic field may be provided in the vacuum circuit breaker 100. The electrode that generates an axial magnetic field is not illustrated.

The vacuum circuit breaker 100 can improve breaking performance due to the axial magnetic field by decelerating each movable electrode 4 during the tripping operation. The vacuum circuit breaker 100 can decelerate each movable electrode 4 by adjusting the speed of the operating device 6. As a result, the vacuum circuit breaker 100 can obtain high breaking performance.

Note that the damping mechanism to be provided in the vacuum circuit breaker 100 may be a mechanism other than the shock absorbers 25 as long as the mechanism damps contraction of the first elastic part by generating a force for decelerating the operating rod 20. The damping mechanism may be a mechanism such as a dash pot or a mechanical link mechanism. A combination of a permanent magnet and a magnetic body may be used as the damping mechanism. In this case, it is possible to damp contraction of the first elastic part by providing a permanent magnet on one out of the first movable portion and the second movable portion, and a magnetic body on the other movable portion, and causing the magnetic body to be attracted to the permanent magnet.

In the first embodiment, the coil spring 18, which is a contact pressure spring that applies a contact pressure in the closing direction to each movable electrode 4, is not provided for each of the three-phase vacuum valves 1, but is provided at a single position between the first movable portion and the second movable portion. Because a damping mechanism that damps contraction of the single coil spring 18 just needs to be provided in the vacuum circuit breaker 100, it is not necessary to provide a damping mechanism for each of the three-phase vacuum valves 1. As a result, the configuration of the vacuum circuit breaker 100 can be simplified as compared with a case where the damping mechanism is provided for each of the three-phase vacuum valves 1. In addition, the cost of the vacuum circuit breaker 100 can be reduced by reduction in size and reduction in the number of parts. Furthermore, it is possible to shorten time taken to adjust opening and closing characteristics before the shipping of the vacuum circuit breaker 100.

Figure 3:
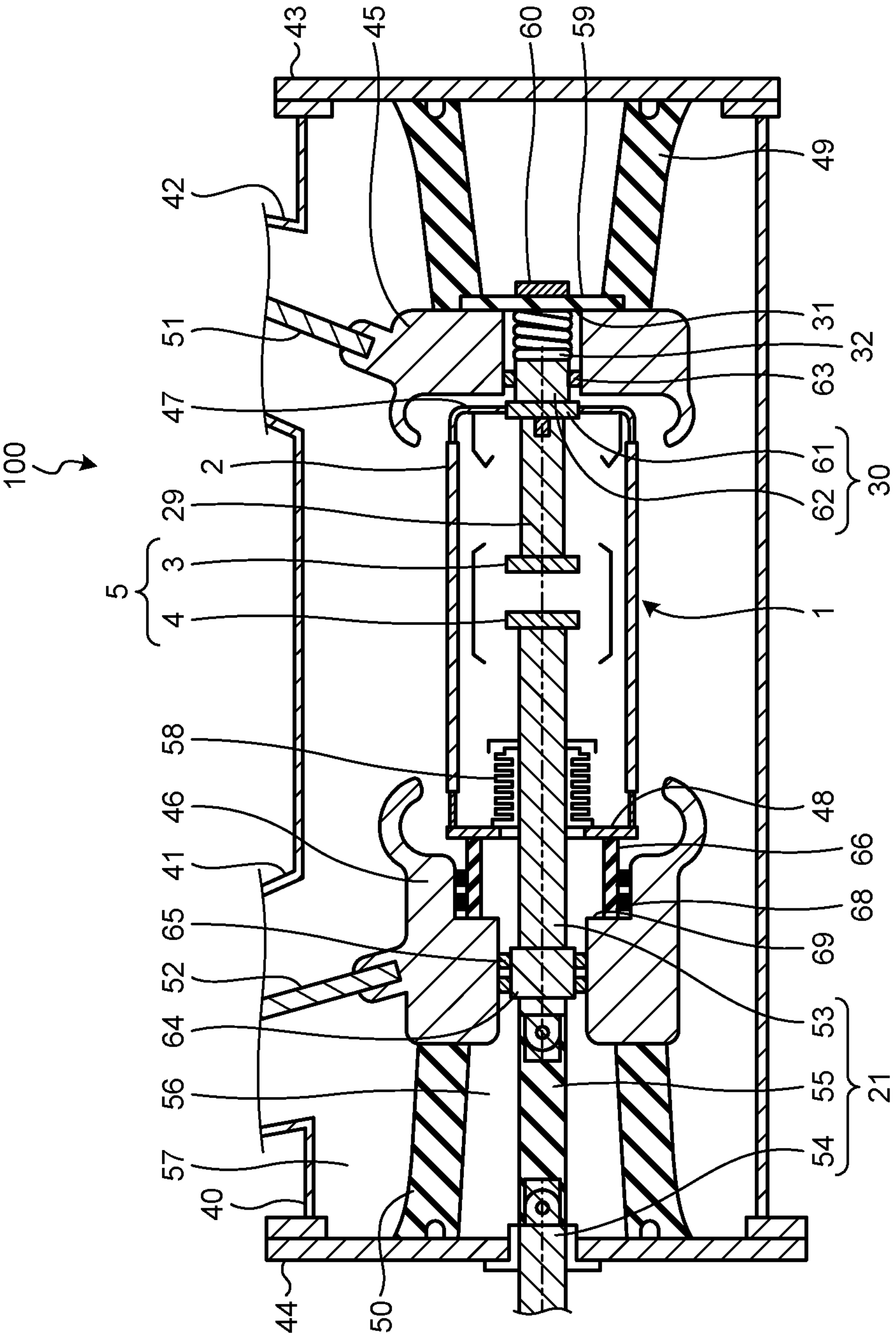
FIG. 3 is a diagram showing an example of a configuration of a vacuum valve included in the vacuum circuit breaker illustrated in FIGS. 1 and 2 and an example of a configuration for supporting the vacuum valve.

Next, a configuration of the vacuum valve 1 and a configuration for supporting the vacuum valve 1 will be described. FIG. 3 is a diagram showing an example of a configuration of the vacuum valve 1 included in the vacuum circuit breaker 100 illustrated in FIGS. 1 and 2 and an example of a configuration for supporting the vacuum valve 1. FIG. 3 illustrates one of the three vacuum valves 1 included in the vacuum circuit breaker 100. Each vacuum valve 1 included in the vacuum circuit breaker 100 has the same configuration. Furthermore, each vacuum valve 1 is supported with the same configuration.

The vacuum circuit breaker 100 includes a tank 40 that is grounded. The vacuum valve 1 is supported inside the tank 40. The tank 40 is provided with two branch pipes 41 and 42. An end of the tank 40 in the closing-direction is covered with a lid 43. An end of the tank 40 in the opening-direction is covered with a lid 44.

A shield 45 is fixed to a cylindrical insulating support 49. The insulating support 49 is fixed to a surface of the lid 43 on the inner side of the tank 40. The shield 45 is supported by the insulating support 49 such that the shield 45 is kept insulated from the tank 40. An outer conductor 51 disposed inside the branch pipe 42 is connected to the shield 45. A cavity is formed at an axial center of the shield 45.

The end 30 that is the end of the fixed shaft 29 in the closing-direction includes a plate portion 61 and a connection part 62. The plate portion 61 is fixed to an end 47 that is an end of the vacuum vessel 2 in the closing-direction. The connection part 62 is fixed to a surface of the plate portion 61 on the closing-direction side. Because the plate portion 61 is fixed to the end 47, the fixed electrode 3 and the fixed shaft 29 are fixed inside the vacuum vessel 2. A multilam band 63 is provided on the outer periphery of the connection part 62. The connection part 62, the multilam band 63, and the coil spring 32 are disposed in the cavity of the shield 45. The multilam band 63 is in contact with the wall of the cavity of the shield 45. The outer conductor 51 and the fixed shaft 29, which is a fixed conductor, are electrically connected to each other via the multilam band 63 and the shield 45.

A shield 46 is fixed to a cylindrical insulating support 50. The insulating support 50 is fixed to a surface of the lid 44 on the inner side of the tank 40. The shield 46 is supported by the insulating support 50 such that the shield 46 is kept insulated from the tank 40. An outer conductor 52 disposed inside the branch pipe 41 is connected to the shield 46. A cavity is formed at an axial center of the shield 46.

The movable shaft 21 forming the second movable portion is passed through the cavity of the shield 46. The movable shaft 21 includes a movable conductor 53, a connecting rod 54, and an insulating rod 55. The movable conductor 53 is provided with the movable electrode 4. The connecting rod 54 is coupled to the operating rod 20. The insulating rod 55 is located between and coupled to the movable conductor 53 and the connecting rod 54. The insulating rod 55 connects the movable conductor 53 and the connecting rod 54 while maintaining insulation between the movable conductor 53 and the connecting rod 54.

The movable conductor 53 is provided with a connection part 64. Multilam bands 65 are provided on the outer periphery of the connection part 64. The multilam bands 65 are in contact with the wall of the cavity of the shield 46. The outer conductor 52 and the movable conductor 53 are electrically connected to each other via the connection part 64, the multilam bands 65, and the shield 46.

The movable conductor 53 penetrates an end 48 that is an end of the vacuum vessel 2 in the opening-direction. An end of the movable conductor 53 in the opening-direction, that is, an end of the movable conductor 53 connected to the insulating rod 55 enters a space 56 inside the insulating support 50.

Out of space outside the vacuum vessel 2 and inside the tank 40, the space 56 inside the insulating support 50 and a space 57 outside the insulating support 50 are filled with insulating gas. The pressure of the insulating gas in the space 57 is higher than the pressure of the insulating gas in the space 56.

A bellows 58 is provided on an inner surface of the end 48 of the vacuum vessel 2. The movable conductor 53 penetrates the inside of the bellows 58. The inside of the bellows 58 communicates with the space 56. The bellows 58 expands and contracts along with movement of the movable conductor 53 in the axial direction. The bellows 58 provided in the vacuum circuit breaker 100 allows the vacuum circuit breaker 100 to move the movable conductor 53 while maintaining vacuum inside the vacuum vessel 2.

A plate portion 59 is attached to the insulating support 49. The plate portion 59 and the insulating support 49 function as a support that supports the fixed electrode 3, the fixed shaft 29, and the vacuum vessel 2. The plate portion 59 is in contact with an end of the shield 45 in the closing-direction, and covers the cavity of the shield 45 from the closing-direction end. The end of the coil spring 32 in the opening-direction is in contact with the connection part 62. The end of the coil spring 32 in the closing-direction is in contact with the surface 31 of the plate portion 59. A fixing bolt 60 that is a fixing part fixes the coil spring 32 to the surface 31. Because the coil spring 32 is fixed to the plate portion 59 by the fixing bolt 60, movement of the vacuum valve 1 is stopped after the contracted coil spring 32 is extended. This prevents the vacuum valve 1 from being detached from the shield 45 when the coil spring 32 extends.

The vacuum valve 1 including the vacuum vessel 2, the fixed electrode 3, and the fixed shaft 29 moves in the axial direction as the coil spring 32 extends and contracts. Because the multilam band 63 is provided, the vacuum valve 1 can slide in the axial direction while maintaining electrical connection between the fixed shaft 29 and the shield 45. In addition, because the multilam bands 65 are provided, the vacuum valve 1 can slide in the axial direction while maintaining electrical connection between the movable conductor 53 and the shield 46.

When the vacuum circuit breaker 100 is in the closed state, the coil spring 32 is contracted. At this time, the vacuum valve 1 is located at a position corresponding to a limit of the range of axial movement of the vacuum valve 1 in the closing-direction. At the start of an opening action performed in the tripping operation, the coil spring 32 extends before the movable shaft 21 moves in the opening direction. As the coil spring 32 extends, the vacuum valve 1 and the end 30 move in the opening direction. When the coil spring 32 extends and returns to its natural length, movement of the vacuum valve 1 in the opening direction is stopped by the fixing bolt After the vacuum valve 1 finishes moving in the opening direction, the movable shaft 21 moves in the opening direction.

When the vacuum circuit breaker 100 is in the open state, the coil spring 32 is in its natural length. At this time, the vacuum valve 1 is located at a position corresponding to a limit of the range of axial movement of the vacuum valve 1 in the opening-direction. During a closing action performed in the closing operation, after the movable shaft 21 moves in the closing direction and the movable electrode 4 comes into contact with the fixed electrode 3, the vacuum valve 1 is further pushed in the opening direction by the reaction force of the coil spring 18 illustrated in FIGS. 1 and 2. Furthermore, the coil spring 32 is contracted. As a result, the vacuum valve 1 moves in the closing direction. In a state where the coil spring 32 is contracted, the vacuum valve 1 finishes moving in the closing direction.

Note that the above description is based on the assumption that the fixing bolt 60 stops movement of the vacuum valve 1 to prevent the vacuum valve 1 from being detached. However, the vacuum valve 1 may be configured such that the vacuum vessel 2 collides with a structure facing the vacuum vessel 2 to prevent the vacuum valve 1 from being detached from the shield 45.

In FIG. 3, a protruding portion 66 protruding in the opening direction from the end 48 is provided at the end 48 of the vacuum vessel 2. The protruding portion 66 is a cylindrical insulator. The protruding portion 66 is assumed to be a part of the vacuum vessel 2. A space surrounded by the protruding portion 66 communicates with the space 56. Sealing parts 68 are provided between the protruding portion 66 and the shield 46, so that the space inside the protruding portion 66 is sealed. The protruding portion 66 faces a surface 69 of the shield 46. The shield 46 is a structure facing the vacuum vessel 2 in the opening direction. FIG. 3 illustrates a state in which an end of the protruding portion 66 in the opening-direction is in contact with the surface 69. The protruding portion 66 slides while maintaining contact with the sealing parts 68 as the vacuum valve 1 moves in the axial direction. As a result, the space inside the protruding portion 66 is kept sealed.

During the opening action, when the vacuum valve 1 moves in the opening direction, the end of the protruding portion 66 in the opening-direction collides with the surface 69. When the protruding portion 66 collides with the surface 69, movement of the vacuum valve 1 in the opening direction is stopped. A material capable of reducing impact from collision with the shield 46 may be used as the material of the protruding portion 66. The vacuum circuit breaker 100 can prevent the vacuum valve 1 from being detached, by either stopping movement of the vacuum valve 1 by means of the fixing bolt 60 or stopping the movement of the vacuum valve 1 due to a collision of the vacuum vessel 2 with the structure. Note that the vacuum circuit breaker 100 may be configured to prevent the vacuum valve 1 from being detached, by both stopping movement of the vacuum valve 1 by means of the fixing bolt and stopping the movement of the vacuum valve 1 due to a collision of the vacuum vessel 2 with the structure.

The switch according to the first embodiment is not limited to the vacuum circuit breaker 100. The switch according to the first embodiment may be a circuit breaker other than the vacuum circuit breaker 100, a disconnector, or the like.

According to the first embodiment, the switch includes the first movable portion for collectively performing the tripping operation for the plurality of electrode portions 5, and the second movable portion integrated with the respective movable electrodes 4 of the plurality of electrode portions 5. In addition, the switch includes the first elastic part disposed between the first movable portion and the second movable portion, and the damping mechanism that damps contraction of the first elastic part during the tripping operation. Thus, the switch has an effect of allowing high breaking performance in the plurality of electrodes to be obtained with a simple configuration.

The configurations set forth in the above embodiment are examples of the subject matter of the present disclosure. The configurations of the embodiment can be combined with another known technique. It is possible to partially omit or change the configurations of the embodiment without departing from the scope of the present disclosure.

REFERENCE SIGNS LIST

1 vacuum valve; 2 vacuum vessel; 3 fixed electrode; 4 movable electrode; 5 electrode portion; 6 operating device; 7, 13, 21 movable shaft; 8 case; 9 fixed iron core; 10 movable iron core; 11 permanent magnet; 12 drive coil; 14 spring bearing; 15, 18, 32 coil spring; 16 speed reduction mechanism; 17 housing portion; 19 opening; 20 operating rod; 22 flange portion; 23, 24 inner wall surface; 25 shock absorber; 26, 30, 47, 48 end; 27 flat plate; 28 adjustment part; 29 fixed shaft; 31, 69 surface; 40 tank; 41, 42 branch pipe; 43, 44 lid; 45, 46 shield; 49, 50 insulating support; 51, 52 outer conductor; 53 movable conductor; 54 connecting rod; 55 insulating rod; 56, 57 space; 58 bellows; 59, 61 plate portion; 60 fixing bolt; 62, 64 connection part; 63, 65 multilam band; 66 protruding portion; 68 sealing part; 100 vacuum circuit breaker.

The invention claimed is:

1. A switch comprising:

a plurality of electrode portions each including a fixed electrode and a movable electrode, the movable electrode being capable of moving with respect to the fixed electrode;

an operating device including a first movable portion for collectively performing tripping operation for the plurality of electrode portions, a plurality of the movable electrodes being collectively separated from a plurality of the fixed electrodes in the tripping operation;

a second movable portion integrated with the plurality of the movable electrodes of the plurality of electrode portions;

a first elastic part to apply pressure for bringing the plurality of the movable electrodes into contact with the plurality of the fixed electrodes, the first elastic part being disposed between the first movable portion and the second movable portion; and a damping mechanism disposed between the first movable portion and the second movable portion and disposed parallel to the first elastic part to damp contraction of the first elastic part during the tripping operation.

2. The switch according to claim 1, comprising: an adjustment mechanism capable of individually adjusting distances between the first elastic part and the plurality of the movable electrodes of the plurality of electrode portions in a direction in which the second movable portion moves.

3. The switch according to claim 1, comprising:

a support supporting the fixed electrode; and a second elastic part to apply pressure for bringing the fixed electrode into contact with the movable electrode, the second elastic part being disposed between the support and the fixed electrode.

4. The switch according to claim 3, comprising:

a vacuum vessel supported by the support, wherein the fixed electrode is fixed inside the vacuum vessel, and the vacuum vessel and the fixed electrode move as the second elastic part extends and contracts.

5. The switch according to claim 4, comprising: a fixing part to fix the second elastic part to the support.

6. The switch according to claim 4, comprising:

a structure facing the vacuum vessel in a direction in which the movable electrode is moved by the tripping operation, wherein the vacuum vessel collides with the structure as the second elastic part extends during the tripping operation.

7. The switch according to claim 1, wherein the damping mechanism damps contraction of the first elastic part caused by continuous movement of the second movable portion during deceleration of the first movable portion.

* * * * *